United States Patent [19]

Ramirez et al.

[11] Patent Number: 5,089,080

[45] Date of Patent: Feb. 18, 1992

[54] COLD CARPET IRON

[76] Inventors: Andrew Ramirez; Simon Ramirez, both of 788 Sequoia Blvd., Tracy, Calif. 95376

[21] Appl. No.: 488,231

[22] Filed: Mar. 5, 1990

[51] Int. Cl.[5] .............................................. B29C 35/00
[52] U.S. Cl. .................................... 156/498; 38/74; 38/77.6; 156/304.4; 156/304.7; 156/579
[58] Field of Search ......................... 38/77.6, 74, 77.2; 156/304.3, 304.4, 304.7, 498, 579

[56] References Cited

U.S. PATENT DOCUMENTS 1,347,224  11/1918  Kako ..................... 38/77.2
3,251,148   5/1966  Knapp .................... 38/77.2

Primary Examiner—David A. Simmons
Assistant Examiner—James J. Engel, Jr.
Attorney, Agent, or Firm—Bielen, Peterson & Lampe

[57] ABSTRACT

A carpet iron constructed with a weighted member having a flat bottom surface with a plurality of orifices therein, through which a cool gas is supplied, the carpet iron being used to press and cool a carpet seam that has been prepared with an underlying hot melt tape.

7 Claims, 2 Drawing Sheets

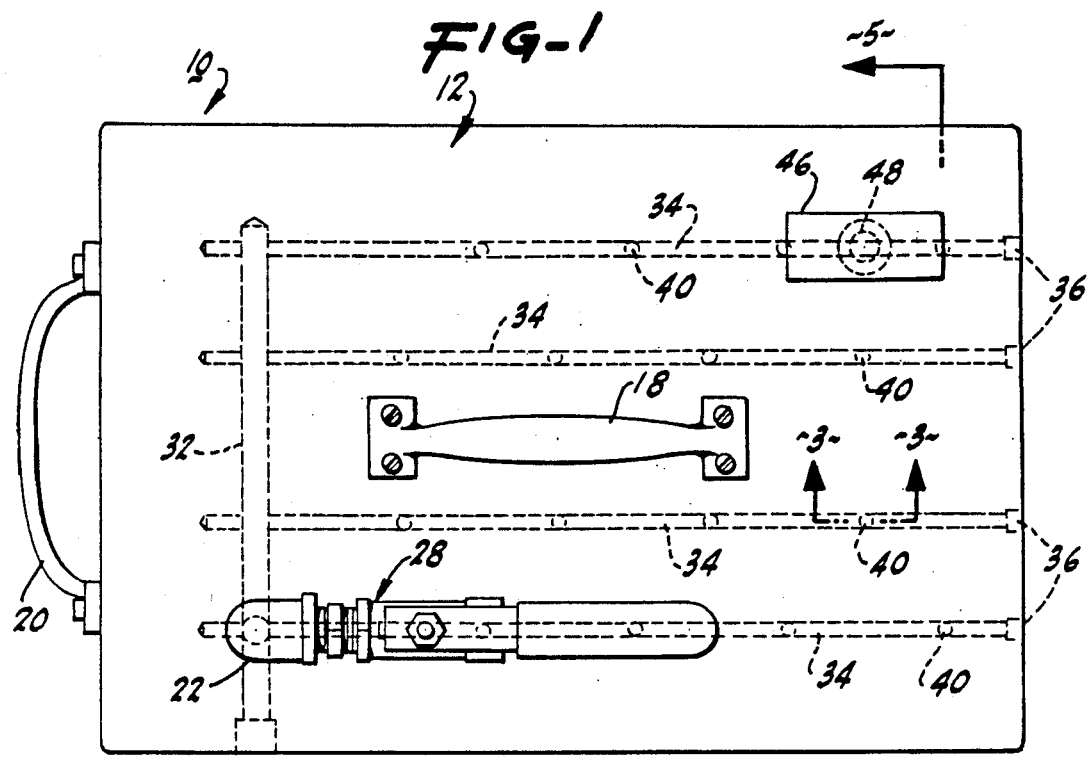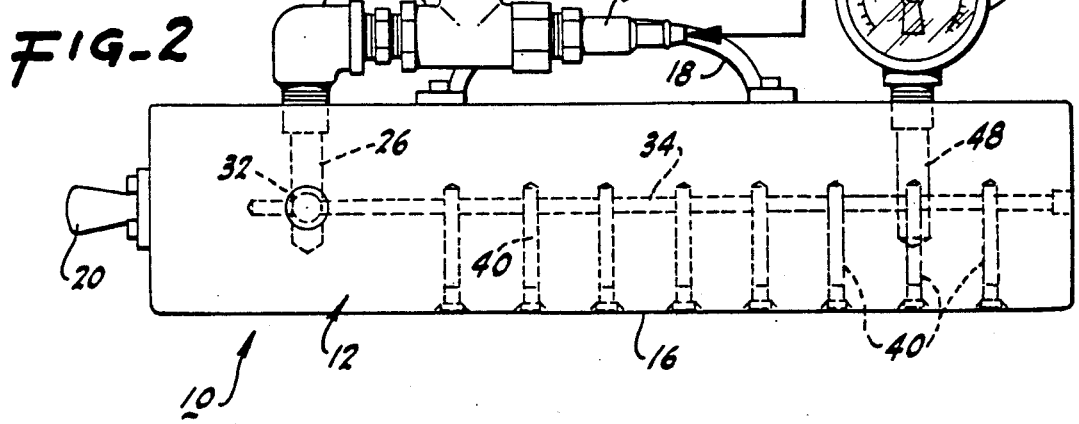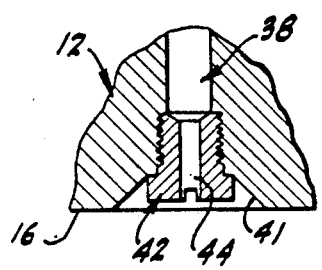

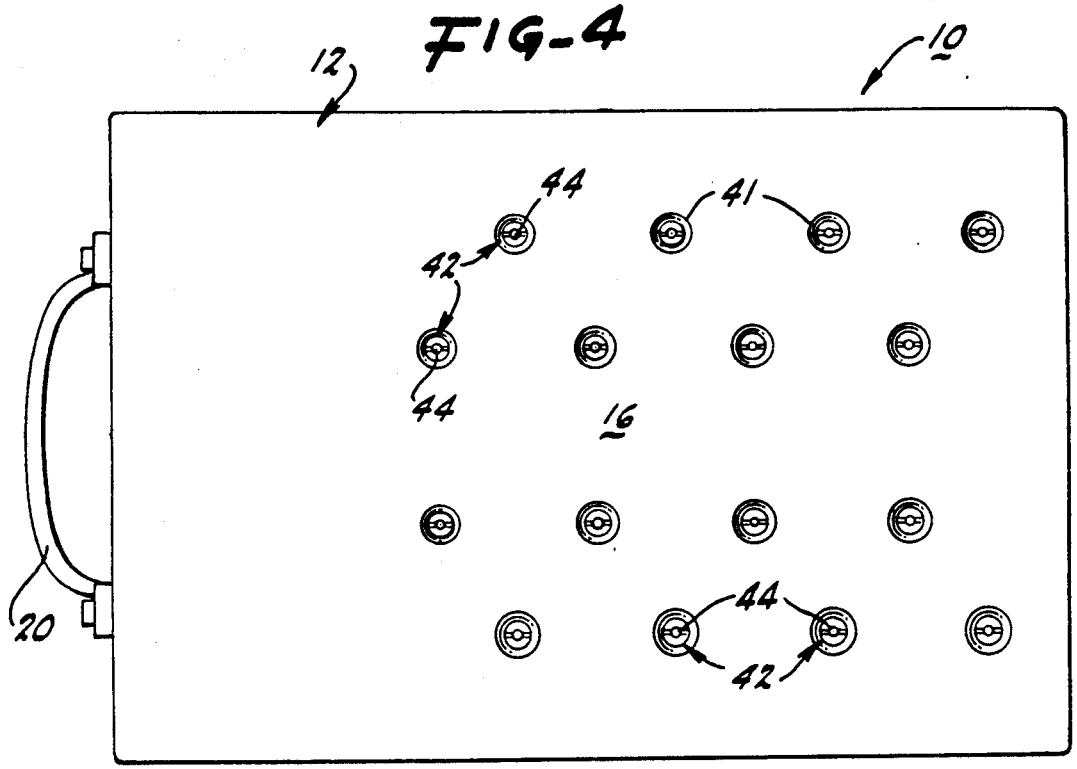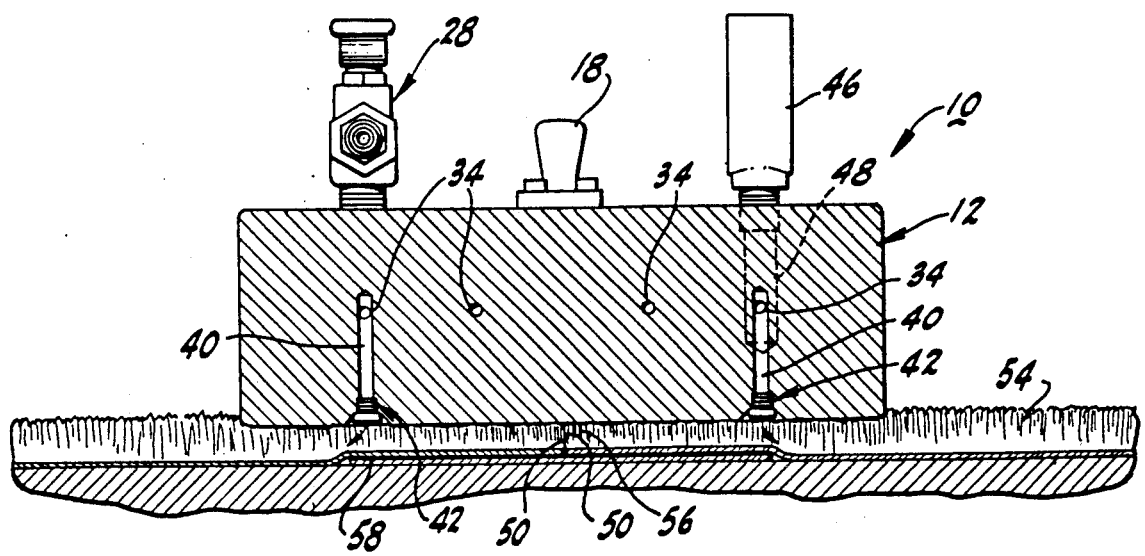

COLD CARPET IRON

BACKGROUND OF THE INVENTION

This invention relates to a cold carpet iron that is used a hasten the cure time of hot melt carpet seams during the installation of floor carpeting. The cold iron has other uses that require material to be pressed with a cooling iron and is particularly adaptable to operations where the curing time can be reduced by application of a cold member thereto. Since the cold carpet iron is particularly adapted for use in laying conventional floor carpeting, the decription of this invention will be primarily directed thereto.

In the assembly of floor carpeting, it's frequently required that the carpet be cut and edges of sections be placed together and connected in some fashion. Previously this connection has been done by hand stitching, floor tacks or other fastners that secure the carpet to the underlying surface, or by adhesive tape of various kinds. While several different adhesive tape have been developed for use in seaming carpet, the best modern method of connecting adjacent segments of carpet is to use an underlying adhesive tape. The tape is prepped by a heating iron that melts the adhesive on the tape before the carpet seams, that have been peeled back, are butted and pressed against the hot melt adhesive. To prevent dislogment and to insure that the sections of carpet remain butted during the cooling period that provides the cure for the hot melt adhesive, it has been the pratice for carpet installers to place heavy objects on the seam such as their tool box or the like. Where long seams must be formed, this practice is not entirely satisfactory, and it would be desirable to have a means for continuously and uniformly cooling the adhesive and insuring that the carpet is pressed firmly against the adhesive during the cure time. It is a primary object that the present invention provide such a convenience and function to efficiently and effectively bond the butted edge of the carpet segments to the underlying hot melt tape.

SUMMARY OF THE INVENTION

This invention relates to a cold iron, and particularly to a cold carpet iron that is suitable for pressing and cool curing hot melt carpet adhesive that is applied under the carpet at the juncture of two carpet segments to form a uniform and virtually indetectable seam. The carpet iron of this invention comprises a weighted block body with a flat underside having a plurality of orifices through which a cooling gas can be emitted. The block structure is preferably of solid aluminum and includes handles to facilitate the pressing action when the carpet iron is manually pushed across the surface of a carpet seam. While of course the carpet iron can be attached to other extensions and means for moving the iron, it has been found that handles are generally preferred as carpet seamers conventionally work the knee on the carpet to both lay the adhesive seam, heat the seam and press the two edge segments of carpet against the adhesive to insure accurate positioning and uniform bonding of the carpet. The use of hot melt carpet tape has substantially expedited the carpet seaming procedure and is cost effective and structurally efficient to bond edges of the carpet together and to the underlying floor at the location of the seam. Furthermore, the use of an adhesive tape prevents the marring of the underlying floor with carpet tacks and the like. Furthermore, appropriate steps can be taken to remove the adhesive from the underlying flooring when the carpet is replaced or removed. In the preferred embodiment the carpet iron is supplied with a CO2 gas that comes from a liquid CO2 storage tank. In such embodiment the carpet iron includes a shut off valve that connects a gas supply line to the interior conduit network that delivers the gas to the discharge orifices. Each of the discharge orifices includes a small nozzle for constricting the discharge opening and regulating the quantity of gas discharged from the multiple nozzles. Gas supplied from the tank is control by a conventional regulating nozzle at the tank. It is preferred, where a gas supply such as air or other compressed gas is delivered to the iron, that the shut off valve at the iron be replaced with a regulating valve to allow for regulation of the gas supply at the cold iron. To insure that a desired pressure is being attained at the inlet network, a pressure regulating valve is installed on the cold iron and communicates with the internal conduit network for the discharge nozzles. Other configurations of the supply can be made without departing from the scope of this invention, which is primarily directed to providing a convenient means of rapidly cooling and pressing hot melt carpet tape to carpet seams.

BRIEF DESCRIPTION OF THE DRAWINGS

FIG. 1 is a top plan view of the cold iron.

FIG. 2 is a side elevational view of the cold iron showing the internal passage in dotted line.

FIG. 3 is an enlarged partial cross sectional view of a discharge nozzle taken on the lines 3—3 in FIG. 1.

FIG. 4 is a bottom plan view showning the arrangement of gas discharge nozzles.

FIG. 5 is a cross sectional view taken on the lines 5—5 in FIG. 1 with the carpet iron in position over a carpet seam.

DETAILED DESCRIPTION OF THE PREFERRED EMBODIMENT

Referring to FIG. 1, the cold iron is designated generally by the refernced numeral 10. The cold iron 10 has a weighted body member 12 which is comprised of a block of aluminum with a flat top and a flat bottom that is polished to allow to minimized friction when slid over the seam of two abutting carpet segments, as described hereafter in greater detail. For the convenience of the user, the body member 12 includes a top handle 18 and a front handle 20 to permit, when necessary, the pressing of a carpet seam with two hands.

Referring also to FIG. 2, the cold iron 10 has a fitting 22 that leads to an internal passage 26 in the body member 12. The fitting 22 is preferably a threaded elbow that permits convenient connection to a shut-off valve 28 that has a male hose fitting 30 for a connection for a gas line of a gas supply 31, shown, schematically in FIG. 2. The internal passage 26, to which the elbow fitting 22 is connected leads to a manifold passage 32. A series of line passages 34 are connected to the manifold. The internal passage 26 is formed by drilling through the top of the body member to manifold passage 32. The internal manifold and line passages 32 and 34 are form by drilling into the body member through the sides of the body member and filling the hole ends with a plug 36 which is preferably formed by a weld fill. Similarly, the plurality of discharge orifices 38 are form by drilling holes through the bottom 16 of the body member 12 with an intersecting discharge passage 40 that intersects the line passages 34. As shown in FIG. 3, the discharge orifice 38 is formed by a countersunk opening 41 and a threaded nozzle plug inset 42. The constricted novel nozzle passage 44 provides a constriction to the gas flow such that there is a pressure build-up in the network of internal passages that feed the discharge nozzle. This pressure can be easily detected by a pressure gauge 46 that is threaded into a gauge passage 48.

What is claimed is:

1. A cold carpet iron for cooling and curing hot melt carpet tape comprising:
    a weighty body member having a flat bottom surface;
    a handle member wherein the body member has a top surface with the handle member attached to the top surface;
    a plurality of orifices in the flat bottom surface with connected gas passages;
    at least one gas inlet, communicating with the gas passages, the inlet having a connected fitting; and
    a gas supply means connected to the inlet fitting for supplying a cooling gas to the gas inlet.

2. The cold carpet iron of claim 1 wherein the orifices each have a nozzle inset therein with each nozzle having a constricted passage.

3. The cold carpet iron of claim 2 wherein the body member has a pressure gauge on the top surface with the connected passages in the body member communicating with the pressure gauge such that the pressure gauge displays the gas pressure in the connected gas passages.

4. The cold carpet iron of claim 1 wherein the inlet fitting includes a valve for regulating the supply of gas from the gas supply means to the carpet iron.

5. The cold carpet iron of claim 4 wherein the body member is fabricated from a solid block of aluminum with drilled and partly fitted holes comprising the gas passages.

6. A cold carpet iron for cooling and curing hot melt carpet tape comprising:
    a weighty body member having a flat bottom surface;
    a handle member wherein the body member has a top surface with the handle member attached to the top surface;
    a plurality of orifices in the flat bottom surface with connected gas passages; and,
    at least one gas inlet, communicating with the gas passages, the inlet having a connected fitting means for attaching an auxiliary gas supply, wherein a $CO_2$ gas is supplied to the carpet iron.

7. The cold carpet iron of claim 6 wherein the $CO_2$ gas is supplied from a liquid $CO_2$ supply.

* * * * *